(12) United States Patent
Ostman

(10) Patent No.: US 7,549,532 B2
(45) Date of Patent: Jun. 23, 2009

(54) CONVEYOR BELT CLEANING SYSTEM AND MOUNTING METHOD

(75) Inventor: Arthur C. Ostman, 5402 Ostman Rd., Mountain Iron, MN (US) 55768

(73) Assignees: Nelson Williams Linings, Inc., Mountain Iron, MN (US); Arthur C. Ostman, Mountain Iron, MN (US)

( * ) Notice: Subject to any disclaimer, the term of this patent is extended or adjusted under 35 U.S.C. 154(b) by 90 days.

(21) Appl. No.: 11/779,115

(22) Filed: Jul. 17, 2007

(65) Prior Publication Data

US 2008/0017479 A1 Jan. 24, 2008

(51) Int. Cl.
*B65G 45/16* (2006.01)
*B65G 45/12* (2006.01)
(52) U.S. Cl. ...................... 198/499; 198/497
(58) Field of Classification Search .......... 198/497–499
See application file for complete search history.

(56) References Cited

U.S. PATENT DOCUMENTS

| | | | |
|---|---|---|---|
| 4,202,437 A * | 5/1980 | Gordon ................. | 198/497 |
| 4,598,823 A | 7/1986 | Swinderman | |
| 4,917,231 A | 4/1990 | Swinderman | |
| 4,953,689 A * | 9/1990 | Peterson et al. .......... | 198/497 |
| 5,011,002 A * | 4/1991 | Gibbs ..................... | 198/497 |
| 5,197,587 A * | 3/1993 | Malmberg ............... | 198/497 |
| 5,865,294 A * | 2/1999 | Betz ....................... | 198/497 |
| 6,082,524 A * | 7/2000 | Brink ...................... | 198/499 |
| 6,296,105 B1 * | 10/2001 | Carnes ................... | 198/499 |
| 6,581,754 B2 * | 6/2003 | Law ........................ | 198/499 |
| 6,986,418 B2 * | 1/2006 | Swinderman et al. .... | 198/497 |
| 7,225,916 B2 * | 6/2007 | Yoshizako et al. ....... | 198/497 |
| 2006/0021855 A1 * | 2/2006 | Kolodziej et al. ........ | 198/498 |
| 2006/0108201 A1 * | 5/2006 | Swinderman ............ | 198/499 |

* cited by examiner

*Primary Examiner*—Mark A Deuble
(74) *Attorney, Agent, or Firm*—Nikolai & Mersereau, P.A.; Thomas J. Nikolai

(57) ABSTRACT

A wiper blade for removing material from a conveyor belt attached to the conveyor belt frame near the nose roller such that the belt will not have material on the belt during the return portion of the loop. The wiper blade is easily attached to and removed from the conveyor frame for installing and replacing the wiper blades when they become worn. The wiper blade is slid out from its slot on the support bar and a new blade inserted into the slot and slid into a locking position for a quick and low cost change of blades. The support bar is rotatably attached to the conveyor frame to adjust the edge of the wiper blade to be proximate the conveyor belt. The wiper blade is made of an elastomeric material without any metal parts for ease of recycling.

11 Claims, 6 Drawing Sheets

CONVEYOR BELT CLEANING SYSTEM AND MOUNTING METHOD

BACKGROUND OF THE INVENTION

I. Field of the Invention

This invention relates generally to conveyor apparatus for transporting bulk materials and more particularly to a conveyor belt cleaner or scraper mechanism that is adapted to be deployed proximate the discharge end of the conveyor for cleaning away material adhering to the conveyor belt.

II. Discussion of the Prior Art

In many industries where granular material in bulk form must be transported from one point to another, it is common practice to utilize an endless flexible elastomeric belt that is entrained about a plurality of rollers where at least one of the rollers is motor driven to thereby carry the belt in an orbital path about a frame structure in which the rollers are journaled. The products deposited on the belt are carried by it to a discharge location where the material is allowed to fall from the belt as the belt traverses the conveyor's nose roller.

It can be appreciated that with some materials there may be a tendency for them to adhere to the belt and be carried beyond the desired discharge. This causes material to be deposited underneath the conveyor and causes expensive cleanup and unnecessary wear and tear on conveyor rollers and other components. In dealing with this problem, one solution has been to provide an elongated scraper blade usually made of rubber or urethane. Other materials such as metals are also used to scrape material from the conveyor belt surface. When using an elastomer scraper or blade, the blade is typically attached to a steel bracket or tube that extends transversely across the width dimension of the endless belt proximate the nose roller of the conveyor. The blade is allowed to rub against the moving conveyor belt with a predetermined force to thereby remove the majority of the bulk product that would adhere to the conveyor belt. Because of the frictional engagement, the scraper blade is subject to wear and may require frequent spatial adjustment and ultimately replacement. Sometimes two or more scrapers will be used one after another to do a more efficient job of cleaning the belt. Keeping conveyor belt cleaners maintained can be costly for a plant or mine operator not only because of the maintenance time involved but because some of the conveyor belt cleaner replacement blades are quite expensive.

In the past, various ways have been devised for mounting conveyor belt cleaners or scrapers to the frame of a conveyor at a location proximate the nose roller thereof.

Several manufacturers such as Martin Engineering, Asgco, Argonics, and Flexco provide belt cleaners that consist of a mainframe of either square or round tubing. A flange is typically welded to the tubing and pins are used to attach the belt cleaner to the flange. One of the described cleaners is manufactured by Martin Engineering and assigned U.S. Pat. No. 4,917,231. Typically the cleaning blades used in the most popular cleaners such as those previously mentioned consist of an aluminum extrusion molded into the polymer blade. The aluminum extrusion corresponds to the upstanding flange and provides support to securely attach the polymer blade. It takes several steps to manufacture a polymer blade with an internal aluminum extrusion including cutting, preparing surfaces and bonding agents. It is a time consuming method. Blades that wear out are typically thrown away and disposing of a blade consisting of polymer and metal combined is more expensive as they are not readily recycled or re-used.

Several manufacturers provide belt cleaners that have cleaning blades that have no internal metal which attach to the mainframe by means of using internally molded "pockets" which slide over upstanding weldments on the mainframe. One of these cleaners is manufactured by Martin Engineering under U.S. Pat. No. 4,598,823. These belt cleaning systems facilitate easy maintenance but have the disadvantage of not being able to utilize a large percentage of the wear media as a large portion of the blade is used to mount it to the weldments. Sometimes a larger portion of material is thrown away than is used to clean the belt, costing money. Another disadvantage of mounting a blade onto upstanding weldments is that the weldments are prone to damage from contact with the belt on the head pulley, or sometimes the cleaner gets pulled through by the belt because of a bad splice or other defect and the weldments are bent. Manufacturing a belt cleaning system consisting of a mainframe with weldments also costs more in materials and labor. As material handling operations around the world continually try to reduce maintenance and operational costs associated with conveyor belt cleaners, there is a need for a belt cleaner assembly that is simple to maintain, cheaper to manufacture, utilizes more of the cleaner blade and is less expensive to dispose of and recycle.

SUMMARY OF THE INVENTION

The conveyor belt cleaner in accordance with the present invention includes a mounting bar comprising a length of steel tubing of rectangular cross-section that is sufficiently long to span the width of the conveyor to be cleaned. Formed through one of the sides of the rectangular tube mounting bar are a series of regularly spaced T-slots where the head of the T comprises a square opening of a first dimension and the stem of the T is rectangular and of a width less than the square head. This stem is, of course, contiguous with the head and centered relative to it.

Completing the assembly are one or more wiper members, each formed from a tough elastomeric material, such as rubber or polyurethane, and including a base portion and an integrally formed arcuate wiper portion having a somewhat tapered cross-section and terminating in a beveled top edge surface. The underside of the base portion forms a channel having relatively short opposed parallel side edges and generally centered between the outwardly projecting side edges are a series of regularly space lugs appearing as a square in a plan view but T-shaped in an end view. The size of the square lugs projecting from the base of the wiper member is such that they readily fit through the square heads of the T-slots formed in the mounting tube, and they are spaced to conform with the spacing between adjacent heads of the T-shaped slots in the mounting tube member.

Being T-shaped in an end view, once the square lugs are inserted through the heads of the T-slots and a longitudinal force is applied to the wiper member, the lugs move into the stem portion of the T-slots. Because the heads of the lugs are wider than the stems of the lugs, the wiper member becomes locked into place.

The width of the channel formed in the base of the elastomeric wiper member is only slightly greater than the width dimension of the mounting tube and the opposed side edges of the mounting tube are thus straddled by the outwardly extending side edges defining the channel in the base of the wiper member. The square mounting tube is bolted or otherwise affixed to the frame of the conveyor closely adjacent to the conveyor's nose roller and with the beveled top edge of the wiper member in rubbing contact with the conveyor belt.

DESCRIPTION OF THE PREFERRED EMBODIMENT

Figure 1:
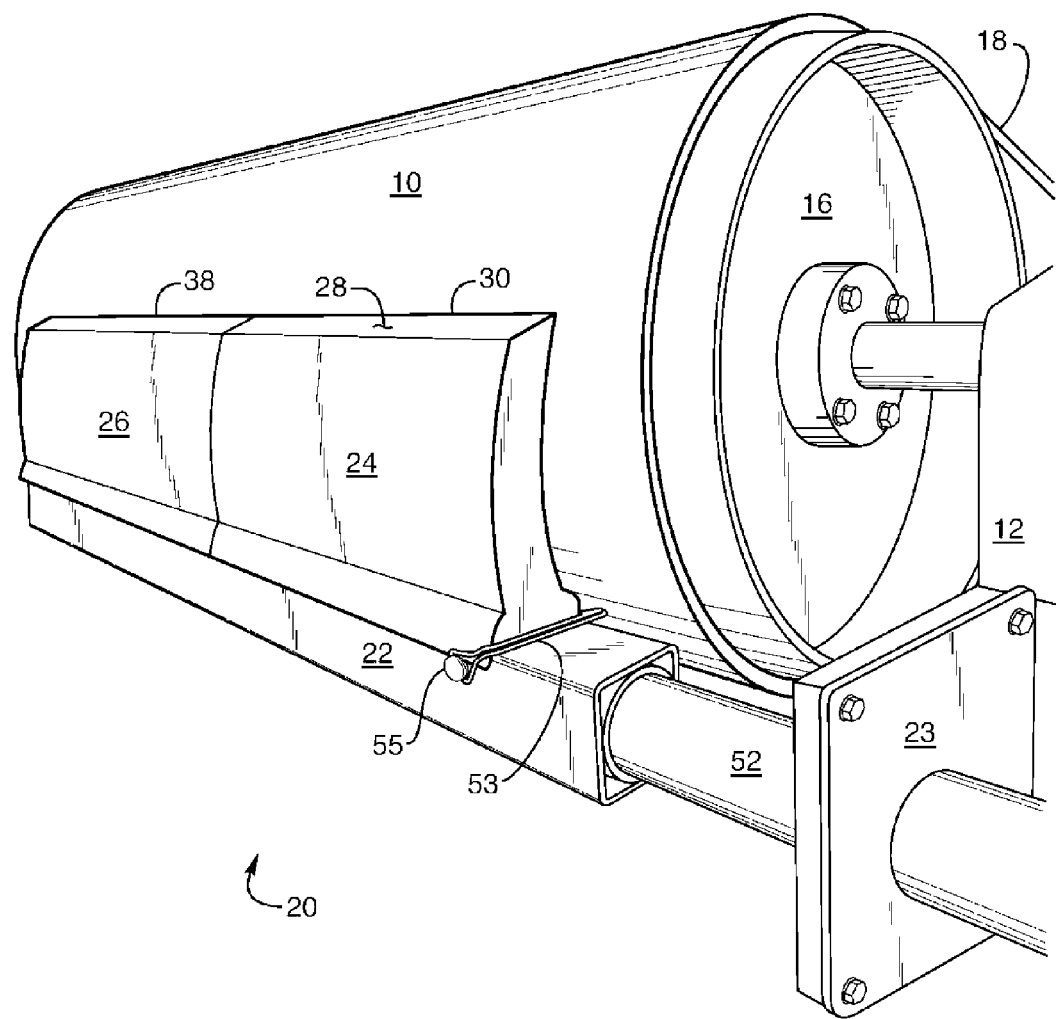
FIG. 1 shows the belt cleaner of the present invention installed to conveyor near head pulley.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring first to FIG. 1, there is indicated generally by numeral 10 a conveyor having a frame 12 supporting bearing blocks on opposed sides thereof and journaled for rotation in the bearing blocks is a nose roller 16 about which is wrapped a conveyor belt 18. Positioned closely adjacent the periphery of the nose roller 16 is the belt cleaning assembly comprising an embodiment of the present invention.

Figure 3:
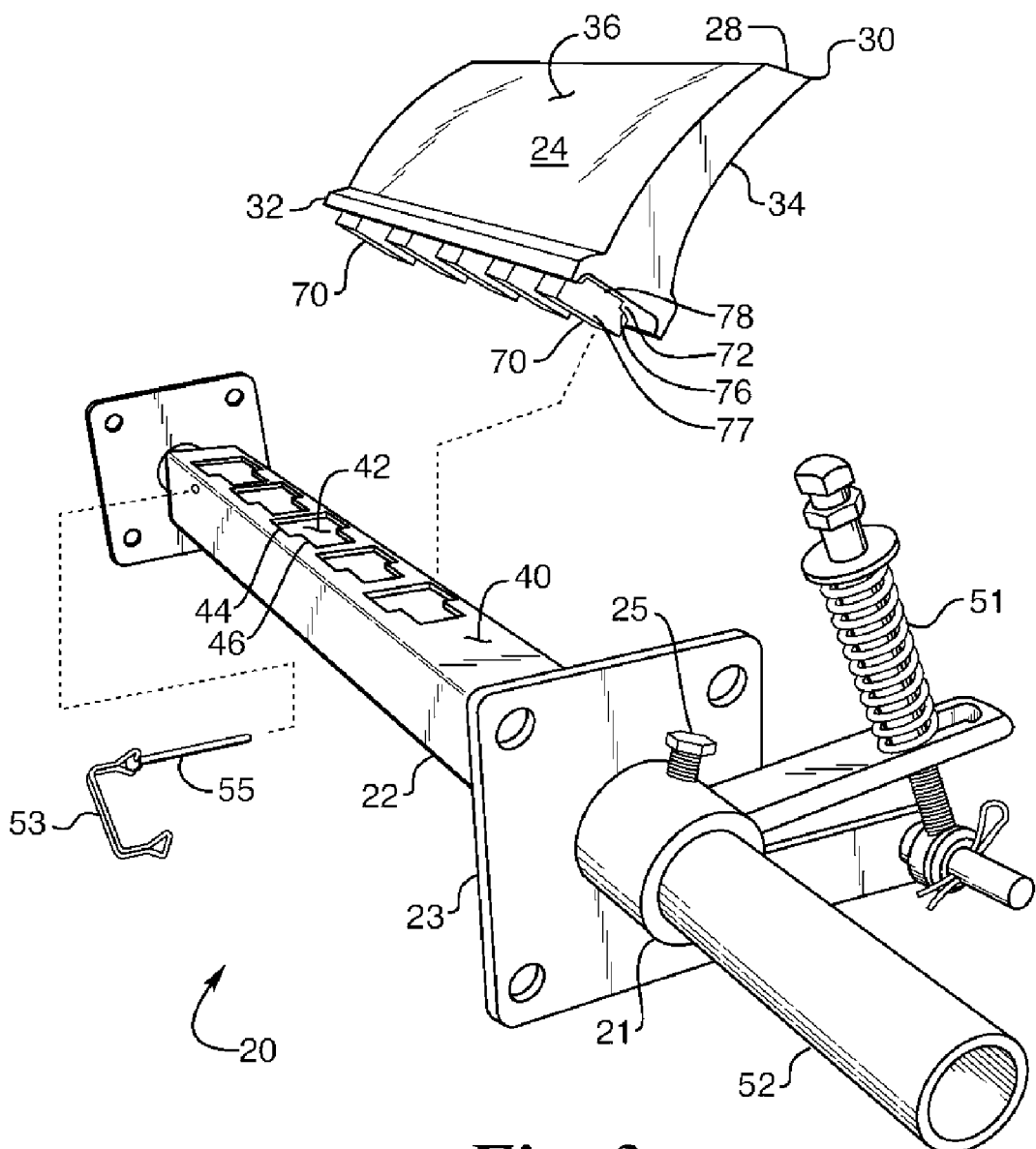
FIG. 3 is a view with the parts partially disassembled.

The cleaning assembly is indicated generally by numeral 20 and is seen to include a mounting bar 22 of generally rectangular (square) cross-section that spans the width of the nose roller 16 and is secured at opposed ends to the frame 12 by mounting plates 23 with a collar 21 and set screw 25 that permit the mounting bar 22 to be rotated and locked when adjustment of the belt cleaning assembly 20 is required as best seen in FIG. 3. Removably attached to the mounting bar 22 are replaceable wiper members, as at 24 and 26, that are preferably molded or extruded from a synthetic rubber or a urethane elastomer especially formulated to resist wear in its rubbing contact with the exposed surface of the conveyor belt 18.

To provide improved wiping action, the top edges 28 of the wipers 24 and 26 are preferably beveled to thereby define a leading edge 30, 38 that engages the belt 18 as it rubs past the cleaning members. As wear occurs, spring 51 rotates cylindrical stub shaft 52 to keep the wiper 24, 26 against the conveyor belt 80. The mounting bar 22 can be unlocked, rotated and relocked to reestablish rubbing contracts between the belt 18 and wipers 24, 26.

Figure 2:
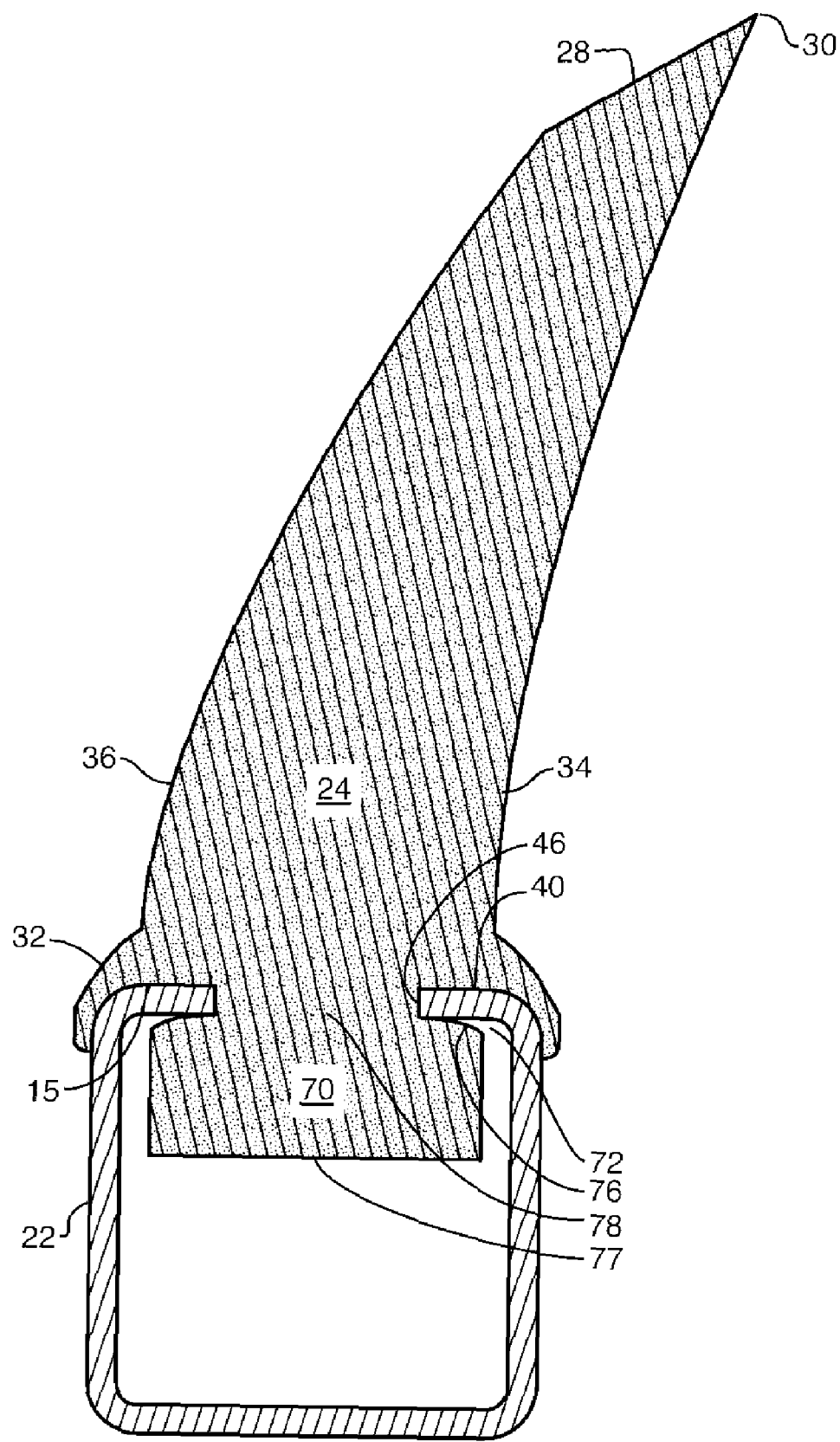
FIG. 2 shows side cut a way view of the wiper blade and its mounting tube.

Referring next to FIG. 2, there is shown a view of the top surface 40 of the mounting bar 22 and a lower surface of the wiper 24. It will be seen in FIG. 3 that the elastomeric wiper member 24 has a base portion 32 and a curved or arcuate profile that is concave along surface 34 and convex along surface 36. The wiper member 24 also tapers in thickness in progressing from the base portion 32 to the beveled top edge 28. Thus, the wiper becomes slightly more flexible proximate its upper end when viewed in FIG. 1 than it is proximate the base.

Integrally formed with the wiper member 24 and projecting from the underside of the base 32 are a plurality of lugs 70 that are somewhat T-shaped with a head 77 and a stem 78 as best seen in FIG. 2. The lugs 70 have a space 72 between the base portion 32 and the ridge 76 to allow the lug to engage the stem portion 46 of T-slot 42.

The top surface 40 of the mounting bar 22 includes a plurality of T-slots 42 which are stamped or otherwise formed therethrough. The head portion 44 of the T-slot 42 is generally rectangular and of a predetermined width dimension. The stem portion 46 of the T-slot 42 is somewhat narrower than the predetermined width dimension of the head portion 44 and the stem 46 is generally centered with respect to the head portion 44.

The lugs 70 projecting from the underside of the wiper blade 24 have heads 77 sized to fit through the head portion 44 of T-slots 42. When the wiper blade 24 is moved to the right in FIG. 3, the stem portion 78 of lug 70 fits into the stem portion 46 of T-slot 42 with the ridge 76 engaging the stem 46 of T-slot 42 to prevent removal for the lug 70 from the mounting bar 22. Space 72 between the ridge 76 and the base of the wiper blade 24 is on the order of the thickness of the mounting bar 22 material to insure a snug fit.

Referring once again to FIG. 1, when the mounting bar 22 is affixed to the frame 12 proximate the nose roller 16, the concave surface 34 of the wiper members 24, 26 accommodates the curvature of the conveyor belt 18 as it rounds the nose roller 16 such that only the upper edge portions 30, 38 of the wiper members 24 and 26 are in rubbing contact with the outer surface of the belt 18 to thereby scrape away debris that might otherwise adhere to the belt. Periodically, as the contacting edge of the wiper members become worn, an operator need only loosen the set screw 25 that are shown as extending through a collar 21 that surrounds a cylindrical stub shaft 52 affixed to the opposed ends of the mounting bar 22 and that extends through the frame 12. The stub shaft 52 can now be torqued to rotate the mounting bar 22 to bring the wipers back into contact with the surface of the conveyor belt 18. The set screws 25 are then retightened. This adjustment step can be carried out, as needed, until such time as the wipers 24 and 26 are worn to the point that they require replacement. Replacement is easily effected by simply moving the wiper members laterally along the mounting bar until the lugs 70 become realigned with the head portion 44 of the T-slots 42 and then the wipers can then be lifted off from the mounting bar 22 and replaced with an unworn set.

Figure 4:
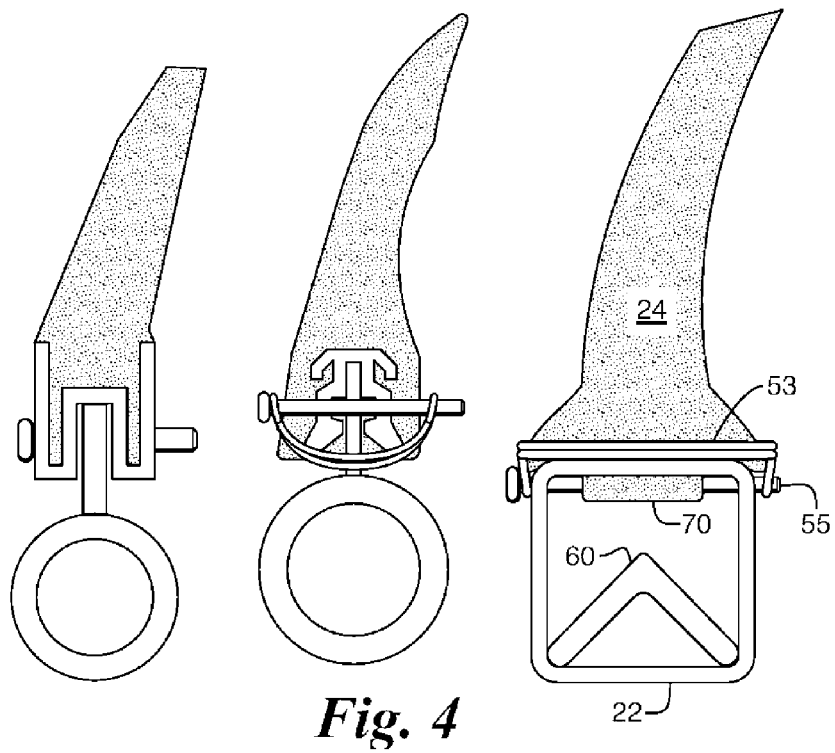
FIG. 4 shows the end view of the present improved invention compared to two other state of the art, widely used belt cleaners.

FIG. 4 is an end view of the present invention on the right and two prior art belt cleaners to its left. Some of the advantages inherent in the present invention include the fact that a greater portion of the wiper member is an elastomer used for cleaning of the belt and less needs to be thrown away when contrasted with the prior art having embedded metal. Because no metal needs to be molded into the blade of the present invention to achieve mounting, the resulting wiper is less expensive than known prior art arrangements. Further, the wiper members can be changed without the need for tools of any type. The mounting system can be used with primary, secondary or under belt cleaners. A further advantage is that adjustment of the wiping pressure of the wiper member against the conveyor belt is easily achieved in a matter of only a few minutes as has been described above.

Figure 8:
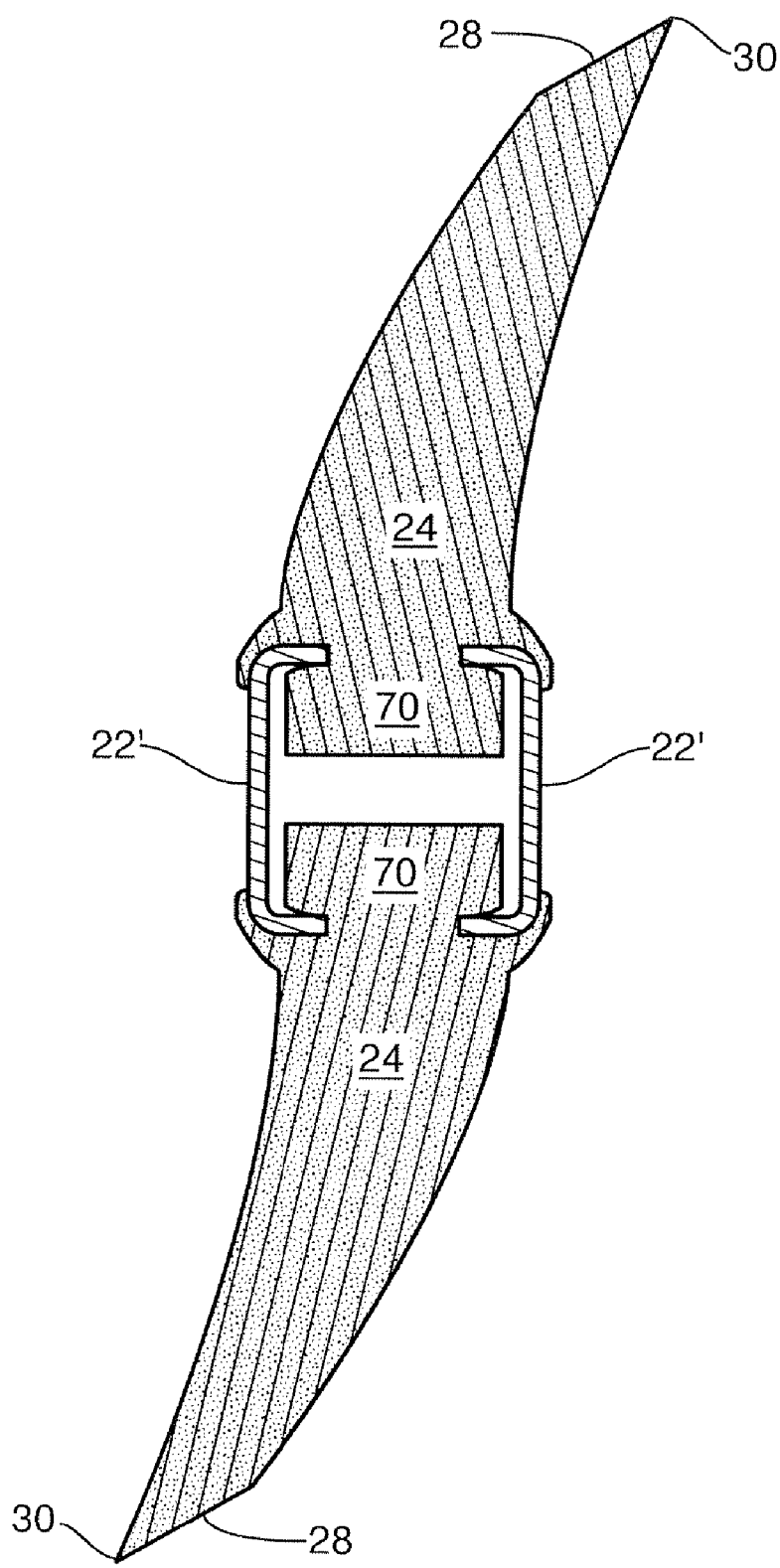
FIG. 8 shows a mounting bar having provision for mounting two sets of wiper blades.

The embodiment shown in FIG. 3 only contemplates placement of a single wiper member on one surface 40 of the mounting bar 22'. As shown in FIG. 8, it is also contemplated that T-slots, like T-slots 42, can be provided on two or more sides of the mounting bar 22' so that when one set of wiper members becomes worn down, an operator need only rotate the bar 22' in the locking collars 21 on opposed sides of the frame 12 to bring a fresh wiper member up and into engagement with the conveyor belt 18 as it travels about the nose roller 16.

Summarizing the advantages of the present invention, with no internal metal in the design of the blade, it is less costly to produce and to dispose of, as many governmental agencies now require, separating of polymer from metals and proper disposal of materials for recycling.

With the mounting method of the present invention using lugs 70 inserted through T-slots 42 in a mounting bar 22, more of the wiper members 24, 26 are used for cleaning the conveyor belt 18 and less is thrown away after the wear limit is achieved. Only a small portion of the wiper members and some lugs are disposed of.

Long length blades can be manufactured and easily cut to length so one size wiper can be inventoried to reduce cost if necessary.

The manufacturing cost of the belt cleaner is greatly reduced by eliminating the weldments on the mounting tube required by the prior art designs.

If bracing 60 or strengthening of mounting tube is needed for a longer length belt cleaner application, it can be strengthened internally as shown in FIG. 4 because of the ability to weld an angle or piece of metal internally, reducing the "footprint" of the tube. This is advantageous in allowing a smaller volume to ship, and the tube can be installed closer to the head pulley and still not have any external weldments interfere with the conveyor surface in the possibility of blade "pull through" from a conveyor splice or flaw grabbing the cleaner. Alternatively the bracing 60 could be on the outside of mounting bar 22.

With the present invention, cylindrical stub shaft 52 mounting ends can be easily "internally mounted" as shown so there are no lock nuts or pins outside of the mounting tube. This reduces shipping cost, chance of lock nut or fastener damage, and makes the whole cleaner assembly more compact for installation in tight areas.

Figure 5:
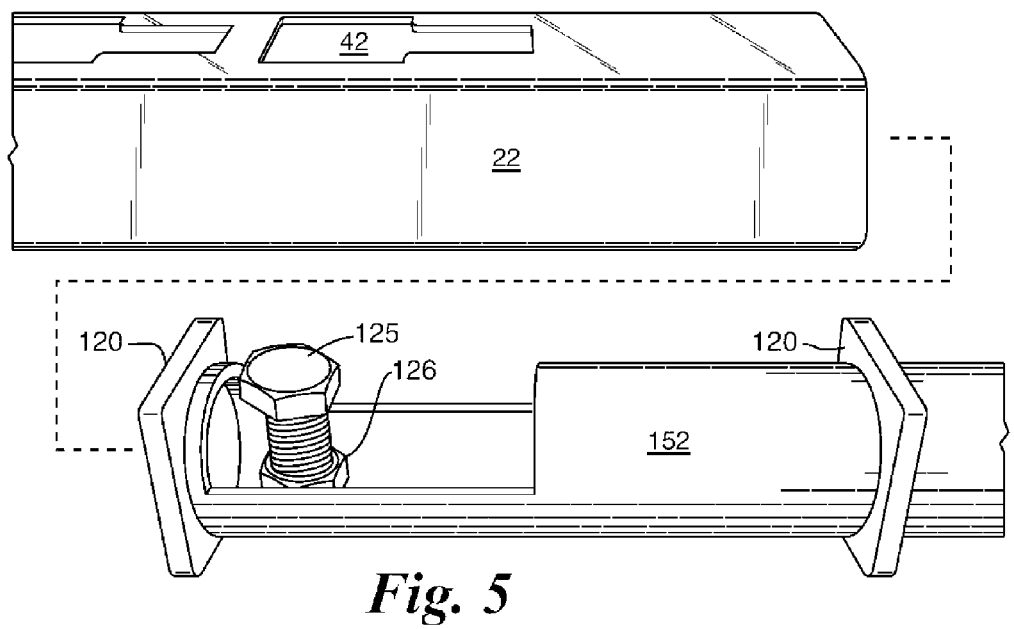
FIG. 5 shows an alternative stub shaft and mounting bar.

Alternatively as shown in FIG. 5 a cylindrical stub shaft 152 with rectangular plates 120 can have an open portion of the shaft exposing set screw or bolt 125 for threading into nut 126 attached to stub shaft 152. The bolt extends through an aperture in the stub shaft 152 to engage mounting bar 22 and can be tightened by a socket or other tool through slot 42 which provides an opening in the mounting bar for tightening the bolt 125 for fixing the stub shaft in a desired position in mounting bar 22. In this manner the bolt 125 is inside of the mounting bar 22 and protected from damage, debris or corrosion making it easier to remove for maintenance.

With the present invention, securing the cleaning blade can be achieved by a retainer pin 55 held in place by wire 53 as seen in FIG. 1. The pin 55 adjacent a lug 70 blocks the lug 70 from moving in the T-slot 42. If internally mounted reinforcement is used as in FIG. 4, apertures can be used on two opposed sides of the mounting bar 22 for a double bladed cleaner that can be simply rotated 180 degrees when one blade is worn out to bring the other into play.

Figure 6:
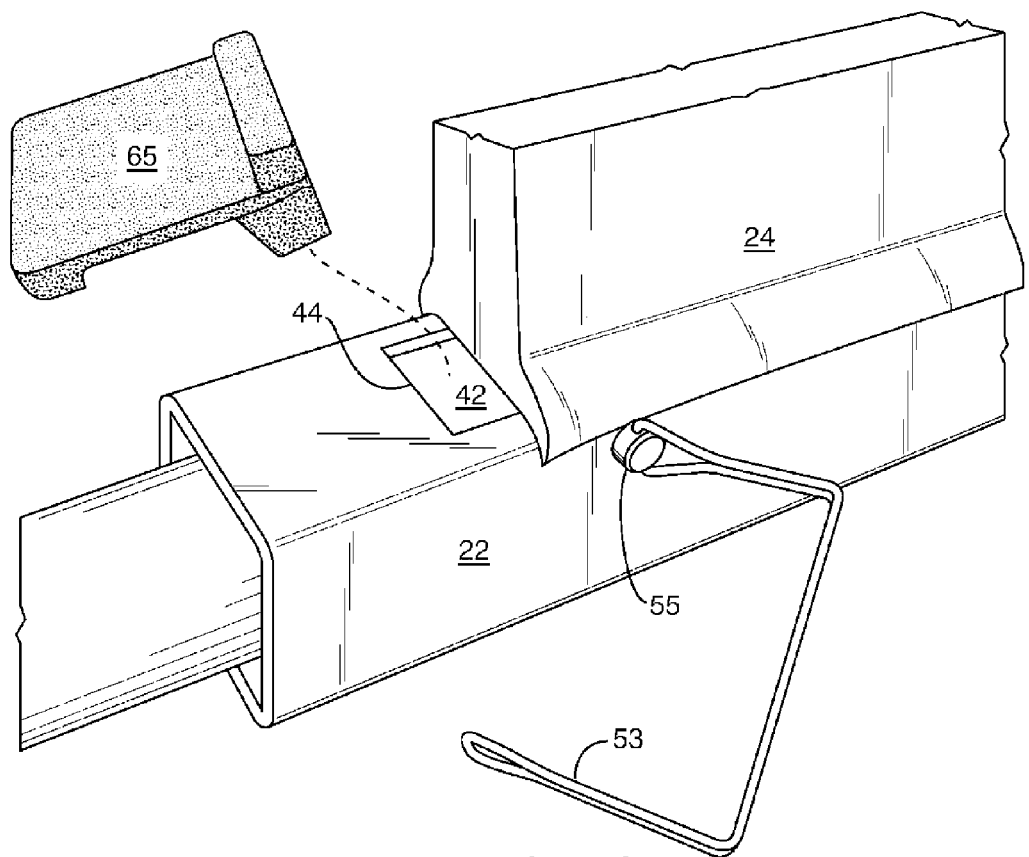
FIG. 6 shows a rubber wedge plug on the mounting bar.

With the present invention, securing the cleaning blade can be achieved by a retainer wire 53 as seen in FIG. 1 or rubber plug/retainer or wedge plug 65 as shown in FIG. 6 can be inserted in the open portion of the head 44 of slot 42 in the mounting bar 22 to prevent debris form entering the interior of the mounting bar 22 and may also be used to prevent the wiper member 24 from sliding out of position in the slots 42 particularly if pin 55 is not used. If pin 55 is used with retainer wire 53 the retainer wire can hold the wedge plug 65 in place.

Figure 7:
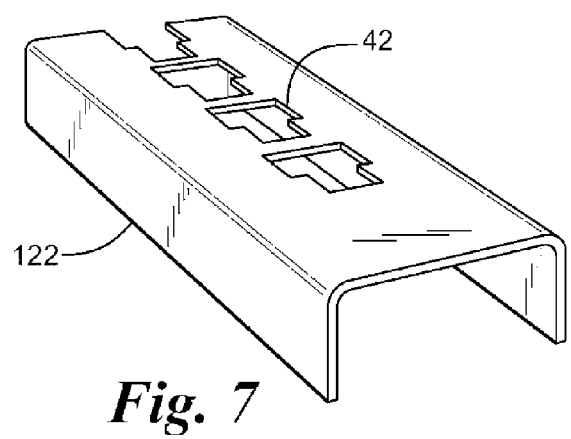
FIG. 7 shows a channel having slots for the wiper member lugs.

Alternatively, instead of the mounting bar 22 being a rectangular tube it could be a channel 122 with slots 42 as shown in FIG. 7.

If desired, the narrowed portion of the conveyor belt cleaner lugs can be manufactured of a softer or more elastic material and the narrow portion of the lugs would stretch and could be used as a tensioning device.

With the present invention, installation and removal is greatly simplified as there is no metal to corrode or seize up, as with other prior art cleaners where the aluminum and dissimilar metals sometimes corrode and jam up.

What is claimed is:

1. A conveyor belt scraping blade assembly comprising,
   a frame holding a mounting bar laterally adjacent a conveyor belt assembly;
   a plurality of slots on at least one face of the mounting bar, the slots being T-shaped with a head portion and a stem portion; and
   a wiper blade having a base with lugs having a T-shape and corresponding to the slots, said lugs projecting outwardly from the base and with a ridge and a gap between the ridge and the base and where the ridge on each lug engages the stem portion of an associated one of the plurality of slots, when the wipe blade is moved laterally relative to the mounting bar following insertion of the lugs into the slot, thereby locking the wiper blade to the frame.

2. A conveyor belt scraping blade assembly as in claim 1 wherein,
   the wiper blade having a concave curved profile, the wiper blade being tapered from the base to the top of the blade, the top of the blade having a beveled top surface with an edge facing for scraping material off of a conveyor belt.

3. A conveyor belt scraping blade assembly as in claim 1 having,
   a cylindrical stub shaft attached to the mounting bar and to the frame for rotationally holding the mounting bar laterally adjacent a nose roller on a conveyor belt assembly, and a set screw in the cylindrical stub shaft for angularly setting the position of the wiper blade relative to the nose roller.

4. A conveyor belt scraping blade assembly as in claim 1 wherein,
   the mounting bar being a tube having a rectangular cross-section.

5. A conveyor belt scraping blade assembly as in claim 4 wherein,
   at least two surfaces of the rectangular mounting bar have T-shaped slots for mounting wiper blades.

6. A conveyor belt scraping blade assembly as in claim 4 wherein,
   the rectangular mounting bar has at least two wiper blades attached.

7. A conveyor belt scraping blade assembly as in claim 1 wherein,
   at least two wipers blades are attached to the mounting bar end to end along the length of the mounting bar.

8. A conveyor belt scraping blade assembly as in claim 1 having,
   a reinforcement bar attached inside of the mounting bar for added strength.

9. A conveyor belt scraping blade assembly as in claim 8 wherein, the reinforcement bar is an angle iron.

10. A conveyor belt scraping blade assembly as in claim 1 having, the wiper blade having a concave curved profile, the wiper blade being tapered from the base to the top of the blade, the top of the blade having a beveled top surface with an edge facing for scraping material off of a conveyor belt.

11. A conveyor belt scraping blade assembly as in claim 10 and further including, a means for fixing the wiper blade in the slot such that the wiper blade ridge remains in place relative to the slot locking the wiper blade to the frame.

* * * * *